United States Patent
Lee

(10) Patent No.: US 9,215,370 B2
(45) Date of Patent: Dec. 15, 2015

(54) DIGITAL PHOTOGRAPHING APPARATUS AND METHOD OF CONTROLLING THE SAME TO INCREASE CONTINUOUS SHOOTING SPEED FOR CAPTURING PANORAMIC PHOTOGRAPHS

(75) Inventor: Myung-hun Lee, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 270 days.

(21) Appl. No.: 13/299,554

(22) Filed: Nov. 18, 2011

(65) Prior Publication Data
US 2012/0293611 A1 Nov. 22, 2012

(30) Foreign Application Priority Data
May 17, 2011 (KR) .................. 10-2011-0046390

(51) Int. Cl.
| H04N 7/00 | (2011.01) |
| H04N 7/01 | (2006.01) |
| H04N 5/262 | (2006.01) |
| H04N 5/232 | (2006.01) |
| H04N 5/235 | (2006.01) |

(52) U.S. Cl.
CPC ....... *H04N 5/23238* (2013.01); *H04N 5/23245* (2013.01); *H04N 5/235* (2013.01); *H04N 5/23216* (2013.01); *H04N 5/23296* (2013.01)

(58) Field of Classification Search
None
See application file for complete search history.

(56) References Cited

U.S. PATENT DOCUMENTS

| 7,133,073 B1 | 11/2006 | Neter | |
| 2003/0210338 A1 | 11/2003 | Matsuoka et al. | |
| 2004/0257380 A1* | 12/2004 | Herbert et al. | 345/619 |
| 2005/0270385 A1* | 12/2005 | Shioya et al. | 348/239 |
| 2009/0040235 A1* | 2/2009 | Matsuda | 345/619 |
| 2009/0147131 A1* | 6/2009 | Mikawa | 348/445 |

FOREIGN PATENT DOCUMENTS

| JP | 08-037634 A | 2/1996 |
| JP | 2000-013685 A | 1/2000 |
| JP | 2005-236511 A | 9/2005 |
| JP | 2010-028764 A | 2/2010 |

OTHER PUBLICATIONS

Search Report established for EP 12162639.4 (Aug. 10, 2012).
PCT Search Report and Written Opinion established for PCT/KR2012/003607 (Nov. 28, 2012).

\* cited by examiner

*Primary Examiner* — Behrooz Senfi
*Assistant Examiner* — Maryam Nasri
(74) *Attorney, Agent, or Firm* — Drinker Biddle & Reath LLP

(57) ABSTRACT

A digital photographing apparatus and a method of controlling the same to increase continuous shooting speed for capturing panoramic photographs. A provided method includes when a plurality of images are captured from an image pickup device during a predetermined period of time to generate a panoramic image, capturing at least one image from among the plurality of images by reading, from the image pickup device, image data corresponding to a predetermined region of a preview image displayed on the digital photographing apparatus, wherein a first number of the plurality of images is greater than a second number of images captured by reading, from the image pickup device, second image data corresponding to an entire region of the preview image during the predetermined period of time.

15 Claims, 5 Drawing Sheets

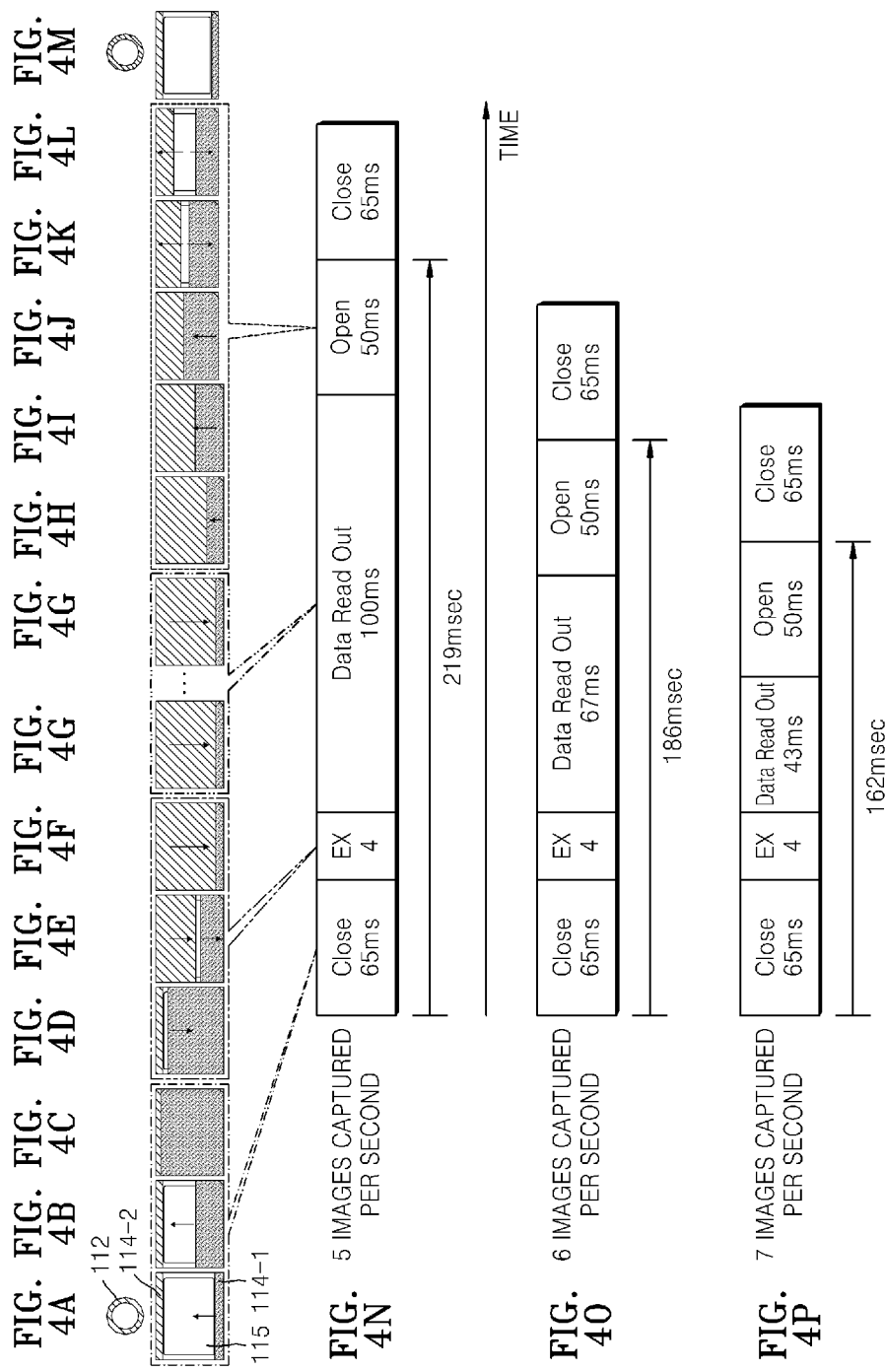

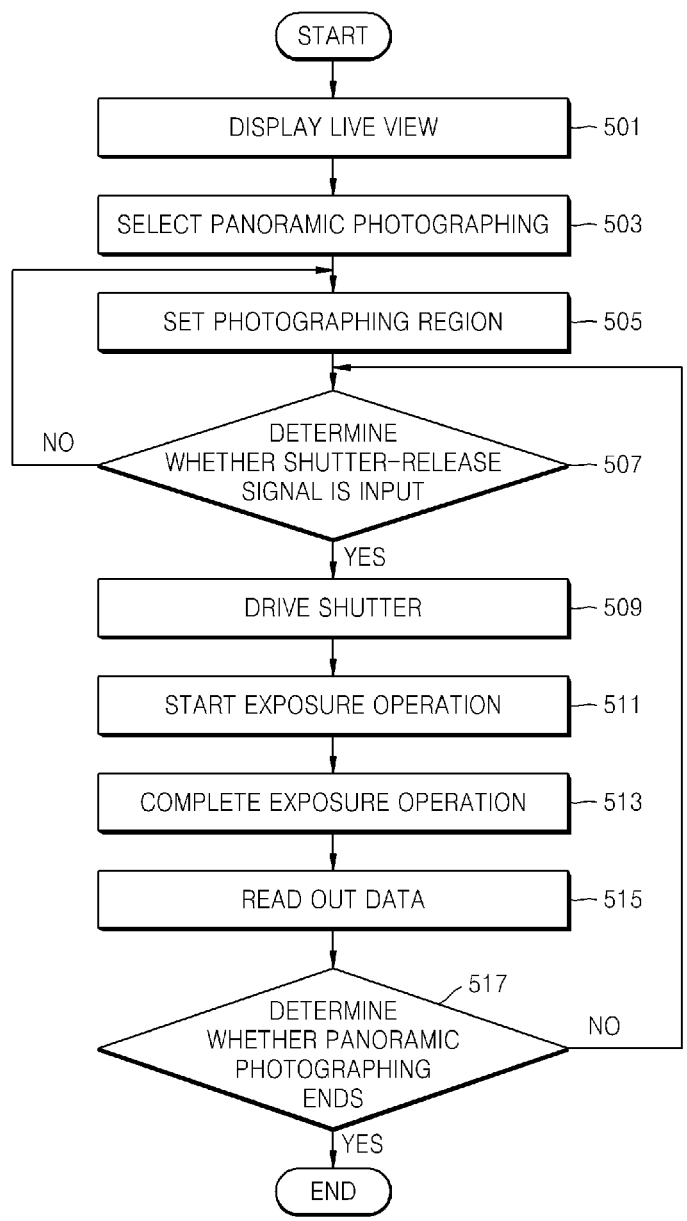

DIGITAL PHOTOGRAPHING APPARATUS AND METHOD OF CONTROLLING THE SAME TO INCREASE CONTINUOUS SHOOTING SPEED FOR CAPTURING PANORAMIC PHOTOGRAPHS

CROSS-REFERENCE TO RELATED PATENT APPLICATION

This application claims the priority benefit of Korean Patent Application No. 10-2011-0046390, filed on May 17, 2011, in the Korean Intellectual Property Office, the entirety of which is incorporated herein by reference.

BACKGROUND

1. Field of the Invention

The invention relates to a digital photographing apparatus and a method of controlling the same to increase continuous shooting speed for capturing panoramic photographs.

2. Description of the Related Art

In general, when a digital photographing apparatus uses a focal plane shutter, the continuous shooting speed of the digital photographing apparatus is directly affected by a shutter operating speed, an operation mechanism, and a time taken to read out imaging data from an image pickup device such as a complementary metal oxide semiconductor image sensor (CIS) or a charge-coupled device (CCD) sensor.

Such a digital photographing apparatus may use a general continuous shooting method to capture a panoramic image. That is, even when a panoramic image for widening a viewing angle in a horizontal direction and a vertical direction is to be captured, because continuous shooting is performed while maintaining an overall viewing angle of an image pickup device like when a still image is to be captured, the high speed continuous shooting required by a panoramic image algorithm may not be achieved, thereby degrading the quality of the panoramic image.

SUMMARY

The invention provides a digital photographing apparatus and a method of controlling the same that may obtain a higher-quality panoramic image by performing photographing at a higher speed than that of general photographing.

According to an aspect of the invention, there is provided a method of controlling a digital photographing apparatus, the method including: (a) setting a photographing region from a live view image input through an image pickup device; (b) driving a shutter; and (c) reading out data from the photographing region by using the image pickup device according to the photographing region.

A number of times operations (b) and (c) are repeatedly performed may equal to a number of images captured per second.

The number of times operations (b) and (c) are repeatedly performed may vary according to a size of the photographing region.

In operation (a), a viewing of the photographing region may be smaller than a viewing angle of the live view image.

Operation (a) may include setting the photographing region according to an image photographing direction.

A viewing angle may be maintained in the image photographing direction, and the viewing angle may be reduced in a direction opposite to the image photographing direction.

In operation (a), the photographing region may be distinguishably displayed on the live view image.

In operation (a), a number of times operations (b) and (c) are to be repeatedly performed may also be displayed when the photographing region is set.

Operation (b) may be performed in response to a shutter-release signal.

After operation (b), the method may further include exposing the image pickup device.

The shutter may be a focal plane shutter.

In operation (a), the resolution of the data may be adjusted according to the photographing region.

According to another aspect of the invention, there is provided a digital photographing apparatus including: an image pickup device that captures an image of a subject; and a digital signal processor that sets a photographing region from a live view image input through the image pickup device, drives a shutter in response to a shutter-release signal, and reads out data from the photographing region by using the image pickup device according to the photographing region.

A number of times the digital signal processor repeatedly drives the shutter and repeatedly reads out the data may equal to a number of images captured per second.

The number of times the shutter is driven and the data is read out may vary according to a size of the photographing region.

The digital signal processor may include a photographing region setter that sets a photographing region having a viewing angle smaller than a viewing angle of the live view image.

The photographing region may be set according to a photographing direction of the subject.

The digital signal processor may maintain a viewing angle of the image pickup device in the photographing direction of the subject, and reduce the viewing angle of the photographing device in a direction opposite to the photographing direction of the subject.

The digital signal processor may distinguishably display the photographing region on the live view image.

After the shutter is driven, the image pickup device may be exposed.

The shutter may be a focal plane shutter.

BRIEF DESCRIPTION OF THE DRAWINGS

The above and other features and advantages of the invention will become more apparent by describing in detail exemplary embodiments thereof with reference to the attached drawings in which:

FIGS. 4A-P are diagrams for explaining an operation of a shutter and a photographing time according to the photographing region of the digital photographing apparatus of FIG. 1, according to an embodiment of the invention; and FIG. 5 is a flowchart illustrating a method of controlling the digital photographing apparatus of FIG. 1, according to an embodiment of the invention.

DETAILED DESCRIPTION

Figure 1:
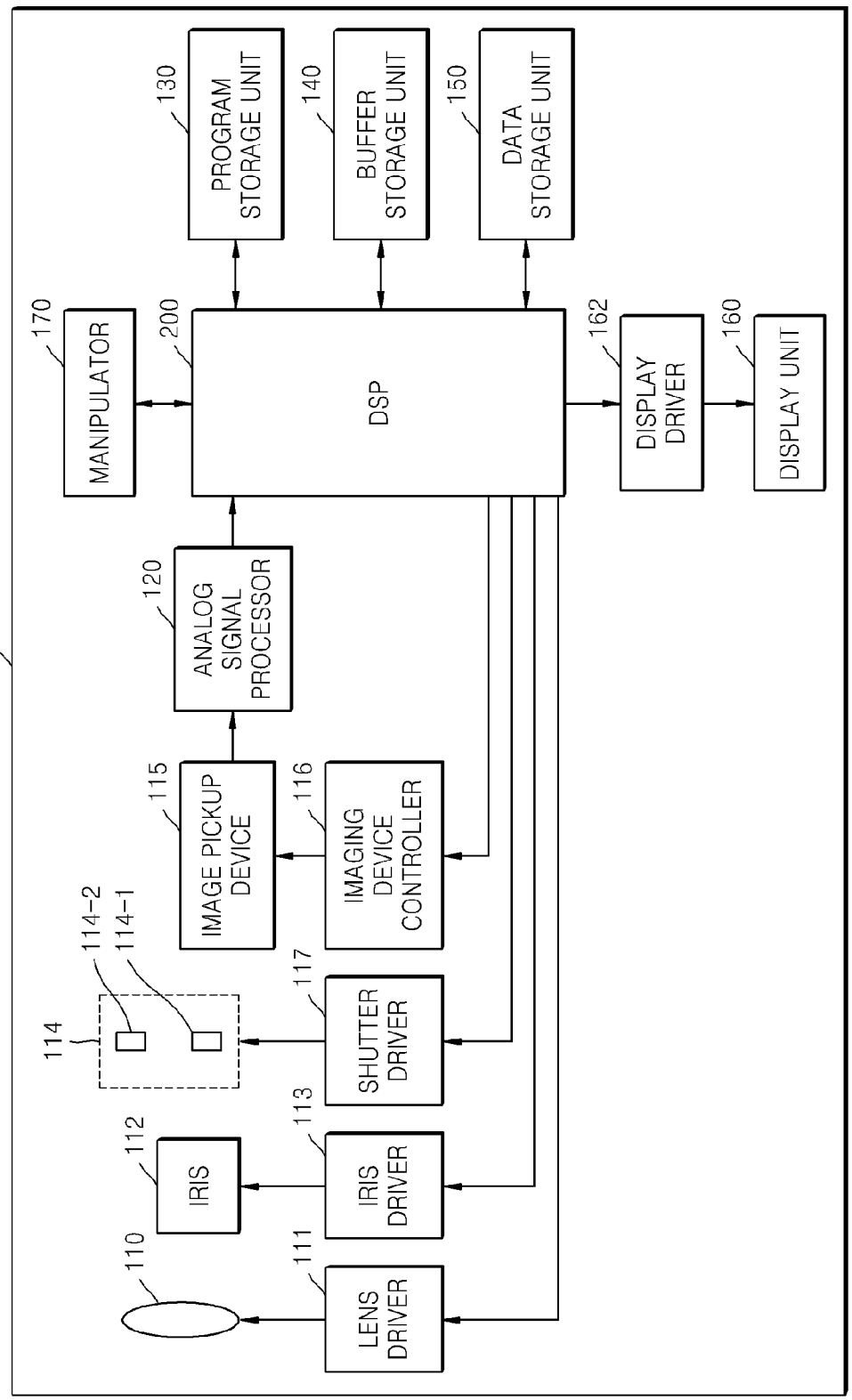
FIG. 1 is a block diagram illustrating a digital photographing apparatus, according to an embodiment of the invention.

As the invention allows for various changes and numerous embodiments, particular embodiments will be illustrated in the drawings and described in detail in the written description. However, this is not intended to limit the invention to particular modes of practice, and it is to be appreciated that all changes, equivalents, and substitutes that do not depart from the spirit and technical scope of this disclosure are encompassed in the invention. In the description of the invention, certain detailed explanations of related art are omitted when it is deemed that they may unnecessarily obscure the essence of the invention.

The terms "first," "second," and the like, "primary," "secondary," and the like, as used herein do not denote any order, quantity, or importance, but rather are used to distinguish one element, region, component, layer, or section from another.

The terminology used herein is for the purpose of describing particular embodiments only and is not intended to be limiting of exemplary embodiments. As used herein, the singular forms "a," "an" and "the" are intended to include the plural forms as well, unless the context clearly indicates otherwise. It will be further understood that the terms "comprises" and/or "comprising" used herein specify the presence of stated features, integers, steps, operations, members, components, and/or groups thereof, but do not preclude the presence or addition of one or more other features, integers, steps, operations, members, components, and/or groups thereof.

The invention will now be described more fully with reference to the accompanying drawings, in which exemplary embodiments of the invention are shown. In the drawings, the same or corresponding elements are denoted by the same reference numerals and a repeated explanation thereof will not be given.

FIG. 1 is a block diagram illustrating a digital photographing apparatus, according to an embodiment of the invention.

A digital camera 100 will be explained as the digital photographing apparatus in the present embodiment. However, the digital photographing apparatus is not limited to FIG. 1, and a digital device such as a camera phone, a personal digital assistant (PDA) or a portable multimedia player (PMP) may be used as the digital photographing apparatus.

The digital camera 100 may include a lens unit 110, a lens unit driver 111, an iris 112, an iris driver 113, an image pickup device 115, an image pickup device controller 116, an analog signal processor 120, a program storage unit 130, a buffer storage unit 140, a data storage unit 150, a display driver 162, a display unit 160, a digital signal processor (DSP) 200, and a manipulator 170. The lens unit 110, the lens unit driver 111, the iris 112, the iris driver 113, the shutter 114, the image pickup device 115, the image pickup device controller 116, and the analog signal processor 120 may be collectively referred to as an imaging unit.

The digital camera 100 also includes a shutter 114. The shutter 114 includes a front curtain 114-1 and a rear curtain 114-2, and vertically moves according to a driving control signal of a shutter driver 117. The shutter 114 is a focal plane shutter. In general, a focal plane shutter includes two cloth curtains or metal curtains provided in front of a focal surface of a lens that horizontally or vertically move, and exposes a photosensitive material surface by adjusting a slit between a front curtain and a rear curtain or running speeds of the front and rear curtains. The focal plane shutter is often installed in a lens-exchangeable camera. The focal plane shutter is also often installed in a camera having an imaging plate smaller than or equal to 6×6 cm, and determines an exposure time by adjusting only a width of the slit by using a speed regulator or an electromagnet that is electrically controlled while maintaining the running speeds of the front and rear curtains. Main characteristics of the focal plane shutter are that an exchangeable lens may be used and a high speed shutter may be easily realized.

The lens unit 110 focuses an optical signal. The lens unit 110 may include a zoom lens for narrowing or widening a viewing angle according to a focal length and a focus lens for adjusting a focus on a subject. Each of the zoom lens and the focus lens may include one lens or a group of lenses. The iris 112 adjusts the amount of incident light by adjusting a degree of opening and closing the iris 112.

The lens unit driver 111 and the iris driver 113 each receive a control signal from the DSP 200 and respectively drive the lens unit 110 and the iris 112. The lens unit driver 111 may adjust a focal length by adjusting a position of a lens, and may perform auto focusing, zooming, focusing, and so on. The iris driver 113 adjusts the degree of opening and closing the iris 112, and may perform auto focusing, automatic exposure correction, focusing, depth of field adjustment, and so on by adjusting an f number or an iris value.

The optical signal passing through the lens unit 110 reaches a light-receiving surface of the image pickup device 115 and forms an image of a subject. The image pickup device 115 may be a charge-coupled device (CCD), a complementary metal oxide semiconductor image sensor (CIS), or a high speed image sensor that converts the optical signal into an electrical signal. Sensitivity or the like of the image pickup device 115 may be adjusted by the image pickup device controller 116. The image pickup device controller 116 may control the image pickup device 115 according to a control signal that is automatically generated due to an image signal that is input in real time or a control signal that is manually input by a user.

An exposure time of the image pickup device 115 is adjusted according to a travel speed of the shutter 114. The shutter 114 adjusts the amount of light incident on the image pickup device 115 as the front curtain 114-1 and the real film 114-2 move with a predetermined slit therebetween.

The analog signal processor 120 may perform noise reduction, gain control, waveform shaping, and analog-digital conversion on an analog signal provided from the image pickup device 115.

The manipulator 170 is an element through which a control signal may be input from a user or the like. The manipulator 170 may include a shutter-release button for inputting a shutter-release signal to perform a photographing operation by exposing the image pickup device 115 to light for a predetermined period of time, a power button for inputting a control signal used to control power on/off of the digital camera 100, a wide angle-zoom button and a telephoto-zoom button for widening or narrowing a viewing angle according to an input, and other various functional buttons for selecting at least one mode/function from a text input mode, a photographing mode, a reproduction mode, a white balance setting function, and an exposure setting function. Also, in an embodiment, the user may select an automatic image processing mode by using the manipulator 170. In the automatic image processing mode, an image processing type or an image processing degree is automatically set based on ambient brightness, instead of being manually set by the user. The manipulator 170 may include various buttons as described above, but the present embodiment is not limited thereto. The manipulator 170 may be any of types that enable the user to input a control signal, such as a keyboard, a touchpad, a touch screen, or a remote controller.

The digital camera 100 includes the program storage unit 130 for storing programs such as an operating system or application system for driving the digital camera 100, the buffer storage unit 140 for temporarily storing data required during an operation or data obtained via the operation, and the data storage unit 150 for storing various types of information required for the program such as an image file including an image signal.

In addition, the digital camera 100 includes the display unit 160 for displaying an operating state of the digital camera 100 or information about an image captured by the digital camera 100. The display unit 160 may provide visual information and auditory information to the user. In order to provide the visual information, the display unit 160 may be, for example, a liquid crystal display panel (LCD) or an organic light-emitting display (OLED) panel. The display driver 162 provides a driving signal to the display unit 160.

The digital camera 100 includes the DSP 200 for processing an input image signal and controlling the elements of the digital camera 100 according to the input image signal or an external input signal. The DSP 200 may perform image signal processing for improving image quality such as noise reduction in input image data, gamma correction, color filter array interpolation, color matrix correction, color correction, or color enhancement. Also, the DSP 200 may generate an image file by compressing image data generated during the image signal processing for improving image quality, or restore the image data from the image file. The image data may be compressed in a reversible or irreversible format. For example, the image data may be compressed in a joint photographic experts group (JPEG) format or a JPEG 2000 format. The compressed image data may be stored in the data storage unit 150. Also, the DSP 200 may perform color, blurring, edge emphasis, image interpolation, image recognition, and image effects. The image recognition may include face recognition and scene recognition. For example, the DSP 200 may perform brightness level adjustment, color correction, contrast adjustment, contour emphasis adjustment, screen splitting, character image generation, and image synthesis.

Also, the DSP 200 may execute programs stored in the program storage unit 130, or include an additional module to generate a control signal for use in auto-focusing, zooming, focusing, and automatic exposure correction and provide the control signal to the lens unit driver 111, the iris driver 113, the imaging device controller 116, or the shutter driver 117, and may control operations of the elements included in the digital camera 100 such as the shutter 114 and a flash (not shown).

The DSP 200 receives a setting signal for setting a photographing region from a live view image input through the manipulator 170, and outputs a driving control signal for driving the shutter 114 in response to a shutter-release signal received via the manipulator 170. Also, the DSP 200 performs an exposure operation by driving the shutter 114 to transmit light to the image pickup device 115, and a data read-out operation for reading out an electrical signal (hereinafter, referred to as data, an image signal, or an input image) accumulated through the image pickup device 115.

Figure 2:
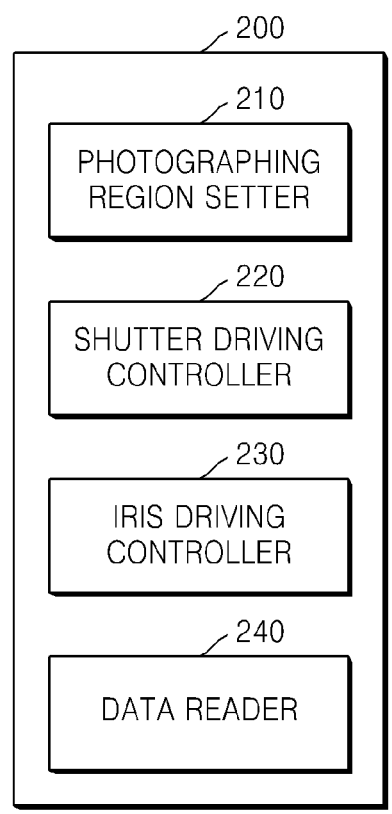
FIG. 2 is a block diagram illustrating a digital signal processor (DSP) of the digital photographing apparatus of FIG. 1, according to an embodiment of the invention.

FIG. 2 is a block diagram illustrating the DSP 200 of the digital camera 100 of FIG. 1, according to an embodiment of the invention.

Referring to FIG. 2, the DSP 200 includes a photographing region setter 210, a shutter driving controller 220, an iris driving controller 230, and a data reader 240.

The photographing region setter 210 sets or selects a photographing region from a live view image input through the image pickup device 115 when a panoramic image is to be captured. A viewing angle of the photographing region may be selected to be smaller than a viewing angle of the live view image. In order to distinguish the photographing region from the live view image, a color of the photographing region and a color of the live view image may be different from each other. A number of images captured per second may vary according to a size of the photographing region. FIG. 3 illustrates examples of the photographing regions that may be set in the digital camera 100 of FIG. 1.

Figure 3A:
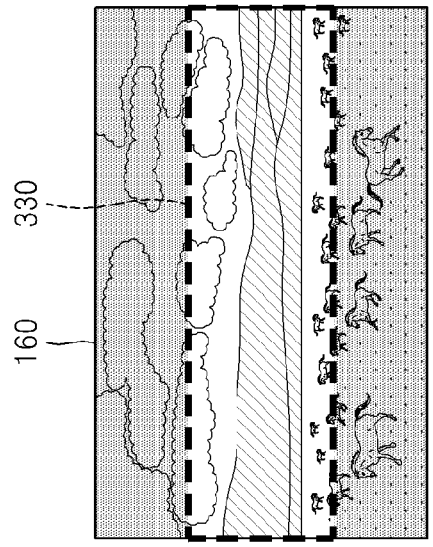
FIG. 3 illustrates examples of a photographing region set in the digital photographing apparatus of FIG. 1, according to an embodiment of the invention.
Figure 3B:
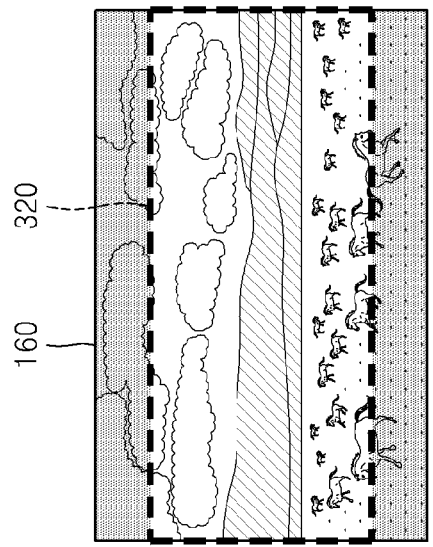
Figure 3C:
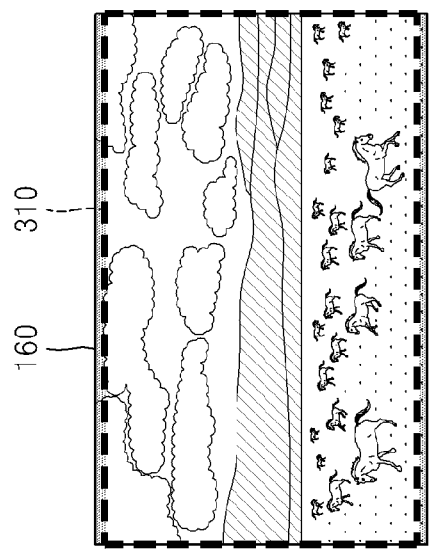

Referring to FIGS. 3A-C, a size of a photographing region may vary according to a user's selection. For example, if a first photographing region 310 is set as shown in FIG. 3A, 5 images may be captured per second. If a second photographing region 320 smaller than the first photographing region 310 is set as shown in FIG. 3B, 6 high-quality images may be captured per second. If a third photographing region 330 smaller than the second photographing region 320 is set as shown in FIG. 3C, 7 ultra high-quality images may be captured per second. Although a horizontal image is exemplarily explained in FIGS. 3A-C, a photographing region may be set for images having other orientations and aspect ratios including a horizontal direction. Also, although a photographing region and a number of images captured per second are separately displayed in FIGS. 3A-C, a number of images captured per second may be displayed along with a selected photographing region.

Once such a photographing region is set, because the image pickup device 115 reads out only data of the photographing region, more images may be captured per second and a higher-quality panoramic image may be captured as a size of the photographing region is reduced. That is, as a viewing angle of the image pickup device 115 in a horizontal direction or a vertical direction is maintained and the viewing angle of the image pickup device 115 in a direction opposite to the horizontal or vertical direction is partially reduced, continuous shooting may be performed at a higher speed than that of general continuous shooting.

Returning to FIG. 2, the shutter driving controller 220 controls the shutter 114 to perform an exposure operation and a data read-out operation in response to a shutter-release signal. An operation of the shutter 114 will be explained with reference to FIGS. 4A-P.

The iris driving controller 230 outputs an iris opening and closing operation control signal. During a data read-out operation, the iris 112 is opened or closed.

The data reader 240 reads out data from the image pickup device 115.

FIGS. 4A-P are diagrams for explaining an operation of the shutter 114 and a photographing time according to a photographing region of the digital camera 100 of FIG. 1.

FIG. 4A illustrates a live view state. A live view is a function where a user takes a photograph via the display unit 160, e.g., an LCD, not a view finder. To this end, when both the front curtain 114-1 and the rear curtain 114-2 of the shutter 114 are opened, light passing through the lens unit 110 forms an image on the image pickup device 115.

FIG. 4B illustrates a changed state where the shutter 114 is changed to a set value due to a shutter-release signal.

FIG. 4C illustrates a closed state. A photographing operation starts as the user completely presses the shutter-release button. The front curtain 114-1 moves upward according to a shutter-release button corresponding to the shutter-release button to be coupled to the rear curtain 114-2, and the shutter 114 is maintained in the closed state such that light does not reach the image pickup device 115.

FIGS. 4D and 4E illustrate an exposure state. An exposure operation starts as the front curtain 114-1 moves upward to be coupled to the rear curtain 114-2 as shown in FIG. 4D, and then both the front curtain 114-1 and the rear curtain 114-2 move downward with a predetermined slit between the front and rear curtains 114-1 and 114-2. The slit is formed due to a difference between a time when the front curtain 114-1 begins to move and a time when the rear curtain 114-2 begins to move, and an exposure time may be adjusted according to travel speeds of the front and rear curtains 114-1 and 114-2. Accordingly, the exposure operation is performed through the slit between the front curtain 114-1 and the rear curtain 114-2.

FIG. 4F illustrates an exposure completed state. Both the front curtain 114-1 and the rear curtain 114-2 move downward, and the rear curtain 114-2 moves further to be coupled to the front curtain 114-1. The exposure completed state is a state where no light reaches the image pickup device 115.

FIG. 4G illustrates a data read-out state. When the exposure operation is completed, data accumulated on the image pickup device 115 begins to be read out as shown in FIG. 4G. This is because a data read-out operation may be performed only when the image pickup device 115 is completely blocked. The shutter driving controller 220 controls the data read-out operation of the shutter 114 to be performed only in the set photographing region.

FIGS. 4H, 4I, and 4J illustrate an opening preparation state. The front curtain 114-1 and the rear curtain 114-2 move upward while contacting each other.

FIGS. 4K and 4L illustrate an opened state. The front curtain 114-1 and the rear curtain 114-2 move upward while contacting each other, only the front curtain 114-1 moves downward, and the rear curtain 114-2 continuously moves upward until the image pickup device 115 is completely opened. FIG. 4M illustrates a live view state like FIG. 4A.

A photographing time in association with an operation of the shutter 114 when a panoramic image is captured according to a set photographing region will now be explained with reference to FIGS. 4N-P. In FIGS. 4N-P, it is assumed that data processing speeds of the image pickup device 115, the shutter 114, and the DSP 200 that are factors for determining an exposure time, a data read-out time, and so on are the same.

FIG. 4N illustrates a state where the first photographing region 310 of FIG. 3 is set. When the shutter-release button is completely pressed in the live view state of FIG. 4A, 65 (milliseconds) ms is spent for the closed state of FIG. 4C, and 4 ms is spent for the exposure corresponding to FIGS. 4D-F. After the exposure is completed, 100 ms is spent for the data read-out operation of FIG. 4G. In contrast, in general photographing, 180 ms is spent for a data read-out operation. However, according to the present embodiment, because a data read-out operation is performed only for the set photographing region, data read-out time can be shorter than the data read-out time in the general photographing. After the data read-out operation ends, because the opening preparation operation of FIGS. 4H through 4J starts, 50 ms is spent to maintain the opened state of FIGS. 4K and 4L. Accordingly, a total of 219 ms is spent as a total photographing time, that is, from pressing the shutter-release button to preparing for next photographing in a live view. When this is applied to a panoramic photograph including 5 photographs, a total of 1 second is spent to perform the closing-exposure-data read-out-exposure-data read-out-exposure-data read-out-exposure-data read-out-exposure-opening operations in FIG. 4N.

FIG. 4O illustrates a state where the second photographing region 320 of FIG. 3B is set. FIGS. 4A through 4F and FIGS. 4H through 4M are the same as those in FIG. 4N, and thus a detailed explanation thereof will not be repeated. In FIG. 4O, after the exposure is completed, only 67 ms is spent for the data read-out operation of FIG. 4G. In contrast, in the case of the first photographing region 310, 100 ms is spent for the data read-output operation. However, because the second photographing region 320 is smaller than the first photographing region 310, the data read-out time is shorter than that in the case of the first photographing region 310. Accordingly, a total of 186 ms is spent as a total photographing time, that is, from pressing the shutter-release button to preparing for next photographing in a live view. When this is applied to a panoramic photograph including 6 high-quality photographs, a total of 1 second is spent to perform closing-exposure-data read-out-exposure-data read-out-exposure-data read-out-exposure-data read-out-exposure-data read-out-exposure-data read-out-opening operations in FIG. 4O.

FIG. 4P illustrates a state where the third photographing region 330 of FIG. 3C is set. FIGS. 4A through 4F and FIGS. 4H through 4M are the same as those in FIG. 4N and thus a detailed explanation thereof will not be repeated. In FIG. 4N, after the exposure is completed, 43 ms is spent for the data read-out operation of FIG. 4G. In contrast, in the case of the second photographing region 320, 67 ms is spent for the data read-out operation. However, because the third photographing region 330 is smaller than the second photographing region 320, the data read-out time is shorter than that in the case of the second photographing region 320. Accordingly, a total of 162 ms is spent as a total photographing time, that is, from pressing the shutter-release button to preparing for next photographing in a live view. When this is applied to a panoramic photograph including 7 ultra high-quality photographs, 1 second is spent to perform closing-exposure-data read-out-exposure-data read-out-exposure-data read-out-exposure-data read-out-exposure-data read-out-exposure-data read-out-exposure-data read-out-opening using the operations in FIG. 4P.

As such, because the data read-out time to read out data from the image pickup device 115 when a panoramic image is captured may be reduced, overall photographing time may be reduced and higher speed photographing may be performed, thereby enabling the user to obtain a higher quality panoramic image.

FIG. 5 is a flowchart illustrating a method of controlling the digital camera 100 of FIG. 1, according to an embodiment of the invention.

Referring to FIG. 5, in operation 501, a live view is displayed. In operation 503, panoramic photographing is selected. The selecting of the panoramic photographing may be performed before the displaying of the live view.

In operation 505, a photographing region is set from or based on a live view image. In the example of FIG. 5, a viewing angle of the photographing region is smaller than a viewing angle of the live view image. In order to distinguish the photographing region from the live view image, a color of the photographing region and a color of the live view image may be adjusted to be different from each other. A number of images captured per second may vary according to a size of the photographing region. FIGS. 3A-C respectively illustrate the first photographing region 310, the second photographing region 320, and the third photographing region 330 variously set according to a user's selection. A number of images captured per second increases as a size of the photographing region decreases.

In operation 507, it is determined whether a shutter-release signal is input after the photographing region is set.

If it is determined in operation 507 that the shutter-release signal is input, the method proceeds to operation 509. In operation 509, the shutter 114 is driven. In operation 511 an exposure operation starts, and in operation 513 the exposure operation ends after a predetermined period of time, that is, an exposure time.

In operation 515, a data read-out operation starts by reading out data from the image pickup device 115. The data read-out operation may be performed only when an image sensor is completely blocked by light. During the data read-out operation, the image pickup device 115 reads out data only in the set photographing region. Accordingly, data read-out time varies according to the size of the photographing region. When the data read-out operation is performed only in the first photographing region 310 in FIG. 4N, a data read-out time (100 ms) is shorter than a data read-out time (180 ms) of general photographing. When a data read-out operation is performed only in the second photographing region 320 in FIG. 4O, a data read-out time (67 ms) is shorter than the data read-out time (100 ms) in the case of the first photographing region 310. When a data read-out operation is performed only in the third photographing region 330 in FIG. 4P, a data read-out time (43 ms) is shorter than the data read-out time (67 ms) in the case of the second photographing region 320.

In operation 517, it is determined whether the panoramic photographing ends. If it is determined in operation 517 that the panoramic photographing needs to be continuously performed, the method returns to operation 507. Referring to FIGS. 3 and 4A-P, 5 images may be captured per second in the case of the first photographing region 310, 6 images may be captured per second in the case of the second photographing region 320, and 7 images may be captured per second in the case of the third photographing region 330 during panoramic photographing.

As described above, according to the one or more embodiments of the invention, because a data read-out time taken to read out data from an image pickup device when a panoramic image is captured may be reduced, an overall photographing time may be reduced and higher speed photographing may be performed, thereby allowing a user to obtain a higher-quality panoramic image.

The embodiments described herein may comprise a memory for storing program data, a processor for executing the program data, a permanent storage such as a disk drive, a communications port for handling communications with external devices, and user interface devices, including a display, keys, etc. When software modules are involved, these software modules may be stored as program instructions or computer-readable codes, which are executable by the processor, on a non-transitory or tangible computer-readable media such as read-only memory (ROM), random-access memory (RAM), a compact disc (CD), a digital versatile disc (DVD), magnetic tapes, floppy disks, optical data storage devices, an electronic storage media (e.g., an integrated circuit (IC), an electronically erasable programmable read-only memory (EEPROM), and/or a flash memory), a quantum storage device, a cache, and/or any other storage media in which information may be stored for any duration (e.g., for extended time periods, permanently, brief instances, for temporarily buffering, and/or for caching of the information). The computer-readable recording medium can also be distributed over network-coupled computer systems (e.g., a network-attached storage device, a server-based storage device, and/or a shared network storage device) so that the computer-readable code may be stored and executed in a distributed fashion. This media can be read by the computer, stored in the memory, and executed by the processor. As used herein, a computer-readable storage medium excludes any computer-readable media on which signals may be propagated. However, a computer-readable storage medium may include internal signal traces and/or internal signal paths carrying electrical signals therein Any references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

Recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as" or "for example") provided herein, is intended merely to better illuminate the invention and does not pose a limitation on the scope of the invention unless otherwise claimed. Numerous modifications and adaptations will be readily apparent to those skilled in this art without departing from the spirit and scope of the invention.

What is claimed is:

1. A method of controlling an apparatus, the method comprising:

when a plurality of images are captured from an image pickup device during a predetermined period of time to generate a panoramic image, capturing at least one image from among the plurality of images by reading, from the image pickup device, image data corresponding to a predetermined sub-region of a preview image displayed on the apparatus; and setting the predetermined region by excluding a region of the preview image, the excluded region comprising all area of the preview image adjacent to the predetermined region in a direction perpendicular from a predefined boundary separating the excluded region and the predetermined region, the boundary being parallel to the panoramic image photographing direction, wherein a first number of the plurality of images is greater than a second number of images captured by reading, from the image pickup device, second image data corresponding to an entire region of the preview image during the predetermined period of time;

the method further comprising:

when the predetermined region is set, displaying a textual or symbolic representation of a quantity of images that may be captured to form the panoramic image.

2. The method of claim 1, wherein as a size of the predetermined region decreases, a time taken to read the image data decreases.

3. The method of claim 1, wherein as a size of the predetermined region decreases, a number of the captured images increases.

4. The method of claim 1, wherein a viewing angle of the predetermined region is smaller than a viewing angle of the preview image.

5. The method of claim 1, further comprising setting the predetermined region based on a panoramic image photographing direction.

6. The method of claim 1, further comprising setting the predetermined region by excluding a region corresponding to a predetermined section of a direction perpendicular to a panoramic image photographing direction.

7. The method of claim 1, wherein the predetermined region is distinguishably displayed on the preview image.

8. An apparatus comprising:

an image pickup device to capture a plurality of images during a predetermined period of time to generate a panoramic image; and a digital signal processor to capture at least one image from among the plurality of images by reading, from the image pickup device, image data corresponding to a predetermined sub-region of a preview image; and a setting element to set the predetermined region by excluding a region of the preview image, the excluded region comprising all area of the preview image adjacent to the predetermined region in a direction perpendicular from a predefined boundary separating the excluded region and the predetermined region, the boundary being parallel to the panoramic image photographing direction, wherein:

a first number of the plurality of images is greater than a second number of images captured by reading, from the image pickup device, second image data corresponding to an entirety of the preview image during the predetermined period of time, and the digital signal processor is to display a textual or symbolic representation of a quantity of images that may be captured to form the panoramic image when the predetermined region is set.

9. The apparatus of claim 8, wherein the digital signal processor is to reduce a time taken to read the image data as a size of the predetermined region decreases.

10. The apparatus of claim 8, wherein the digital signal processing is to increase a number of the captured images as a size of the predetermined region decreases.

11. The apparatus of claim 8, wherein the digital signal processor is to make a viewing angle of the predetermined region smaller than a viewing angle of the preview image.

12. The apparatus of claim 8, wherein the digital signal processor is to set the predetermined region based on a panoramic image photographing direction.

13. The apparatus of claim 8, wherein the digital signal processor is to set the predetermined region by excluding a region corresponding to a predetermined section of a direction perpendicular to a panoramic image photographing direction.

14. The apparatus of claim 8, wherein the digital signal processor is to distinguishably display the predetermined region on the preview image.

15. A tangible non-transitory computer-readable storage medium storing instructions that, when executed, cause a machine to at least carry out a method of controlling an apparatus, the method comprising:

when a plurality of images are captured from an image pickup device during a predetermined period of time to generate a panoramic image, capturing at least one image from among the plurality of images by reading, from the image pickup device, image data corresponding to a predetermined sub-region of a preview image displayed on the apparatus; and setting the predetermined region by excluding a region of the preview image, the excluded region comprising all area of the preview image adjacent to the predetermined region in a direction perpendicular from a predefined boundary separating the excluded region and the predetermined region, the boundary being parallel to the panoramic image photographing direction, wherein a first number of the plurality of images is greater than a second number of images captured by reading, from the image pickup device, second image data corresponding to an entire region of the preview image during the predetermined period of time the method further comprising:

when the predetermined region is set, displaying a textual or symbolic representation of a quantity of images that may be captured to form the panoramic image.

* * * * *